Patented June 25, 1929.

1,718,373

UNITED STATES PATENT OFFICE.

RALPH A. NELSON, OF BUFFALO, NEW YORK, ASSIGNOR TO NATIONAL ANILINE & CHEMICAL COMPANY, INC., OF NEW YORK, N. Y., A CORPORATION OF NEW YORK.

PRODUCTION OF BENZIDINE AND DERIVATIVES.

No Drawing.   Application filed June 22, 1920.   Serial No. 390,886.

This invention relates to the production of compounds of the benzidine series from the corresponding hydrazo compounds, by an operation commonly known as rearrangement. The invention is applicable, for example, to the conversion of hydrazo-benzene ($C_6H_5NH-NHC_6H_5$) to benzidine ($NH_2-C_6H_4-C_6H_4-NH_2$) or of hydrazo-toluene to tolidine or of hydrazanisol to dianisidine (4-4'-diamino-3-3'-dimethoxy-diphenyl).

The present invention is based upon the discovery that the rearrangement of hydrazo compounds to the corresponding compounds of the benzidine series can be carried out with particular advantage by subjecting the hydrazo compound, dissolved in an organic solvent immiscible with water, to the action of sulfuric acid of appropriate strength and amount, the hydrazo compound being rearranged in solution, and the benzidine compound being obtained directly in a solid state such that it can be readily separated from the solvent, as more fully hereinafter described.

In the practice of the invention, the hydrazo compound in an isolated state, may be dissolved in a suitable solvent such as benzene or toluene, or there may be used a solution of the hydrazo compound otherwise produced, for example, a solution such as is obtained by extraction of the hydrazo compound from admixture with zinc oxide residue, as described in Letters Patent Nos. 1,644,483 and 1,644,484, dated Oct. 4th, 1927. As set forth in said patents, the nitro compound is subjected to reduction in the presence of a suitable organic solvent, and the hydrazo compound, resulting from the reduction, is separated from the zinc oxide residue by extraction with a suitable organic solvent immiscible with water. The reduction can thus be effected in the presence of the same solvent used for extracting the hydrazo compound from the zinc residue, or the reduction can be effected in the presence of alcohol, the alcohol subsequently removed, and the hydrazo compound then extracted with a suitable solvent. A solution of the hydrazo compound in the immiscible organic solvent thus produced is well adapted for use in the carrying out of the process of the present invention.

The hydrazo compound in the organic solvent is subjected to the action of sulfuric acid of appropriate strength and amount so that the benzidine compound is directly obtained, in the form of its sulfate, in a solid form, well adapted for separation from the solvent and for recovery of the benzidine compound in a state of high purity. By proper regulation of the strength and amount of sulfuric acid used, and by the use of a suitable organic solvent for the hydrazo compound, the formation of emulsions, difficult to handle, can be avoided, and the benzidine compound obtained in a solid form, rather than in the form of a suspension, thus materially facilitating its separation, isolation, and purification. The rearrangement can however, be carried out with relatively dilute acid and in the presence of a larger amount of water, although the use of a more concentrated acid, and the direct production of the benzidine compound in a solid state, is much more advantageous, and is to be recommended. The solution of hydrazo compound employed is substantially free from inorganic impurities, particularly such impurities as are commonly admixed with it in its production, e. g. zinc oxide, excess alkali, etc., and which, if present, would require a corresponding excess of acid for their neutralization.

The strength of the sulfuric acid employed is capable of some variation, but for best results e. g., for the production of dianisidin, sulfuric acid of about 30 to 40% strength should be used. For the production of benzidine and tolidin a more concentrated acid should be used for best results, e. g. 40 to 50% acid for benzidine. When relatively strong acid of this strength is used, the amount of acid required for the rearrangement is relatively small, and excellent yields are obtained. Also, the formation of emulsions and other difficulties in the separation of the benzidine compound, such as are attendant upon the use of a weaker acid, are avoided or minimized. On the other hand, the use of a too concentrated acid tends to favor the formation of other compounds than those desired. The strengths and amounts of acid are, of course, interdependent, so that, with different strengths of acid, different amounts should be used.

Hydrochloric acid can be used for the rearrangement in the presence of a solvent, but the use of sulfuric acid for the rearrangement has the advantage over the use of hydrochloric acid that increased solubility due to the presence of sodium chloride or hydrochloric acid is avoided, and the benzidine compound is directly obtained in the form of the sulfate, whereas the formation of the hydrochloride and the subsequent salting out of the sulfate by means of sodium sulfate or sulfuric acid, not only involves added manipulation and operations, but a loss of the benzidine compound, owing to the increased solubility of the sulfate thereof in the presence of the chloride or hydrochloric acid. Tolidin sulfate is more soluble than benzidine sulfate, while dianisidin sulfate is even more soluble. Hence there is an increased advantage in the case of the latter compounds when they are directly separated in the form of their sulfates. By proceeding according to the present invention, high yields, in certain cases approximating the theoretical, can readily be obtained.

The solvent used for the hydrazo compound, and in the presence of which the rearrangement takes place, is preferably and advantageously benzene, owing to its increased solvent action and its low boiling point. Toluene can be similarly used although with somewhat less advantage. Higher boiling solvents, such as xylene, solvent naphtha, etc., can be used, but are less advantageous and are less to be recommended.

The invention will be further illustrated by the following specific description:

*Production of dianisidine.*—85 gallons of a benzene solution of hydrazanisol, containing about 110 pounds of hydrazanisol, is placed in a covered lead-lined vat and cooled with agitation to a temperature of about 8 to 15° C., preferably about 10° C., by means of brine coils or other suitable cooling means, and 150 pounds of 40% sulfuric acid are added slowly, while maintaining the temperature at about 10° C., and with vigorous agitation. A considerable period of time may be required for the complete addition of the acid, amounting to as much as 3 hours, although this time period is capable of some variation.

During the progress of the rearrangement, as the acid is gradually added, the dianisidin formed separates out as the sulfate, in the form of a paste, which thickens and becomes stiff when about four-fifths of the acid is added, and then softens as the balance of the acid is added, and becomes of almost putty-like consistency when the rearrangement is complete. The mass is agitated for a further period of time after the acid has all been added in order to insure completion of the rearrangement. Small amounts of sodium thiosulfate or sodium acid sulphite are advantageously added from time to time during the operation to prevent oxidation of the reduction and the rearrangement products.

The dianisidin sulfate formed separates and settles to the bottom of the vat, and, when the operation is completed, and the dianisidin sulfate is in the form of a stiff paste, it holds but a small amount of the benzene, the greater portion of the benzene forming a separate layer above the paste. If the paste is too stiff, it may be softened somewhat by the addition of a small amount of water. Owing to the character of the dianisidin sulfate, the benzene liquor can be readily separated by decantation. The dianisidin sulfate can then with advantage be washed one or more times by adding further amounts of benzene, permitting the mass to settle and removing the benzene by decantation. The washings are repeated until the benzene solution obtained has but little color. The benzene liquors carry off whatever azoanisol or unchanged hydrazanisol may be present in admixture with the dianisidin sulfate. The benzene can be recovered from the benzene mother liquor by distillation. The benzene used for washing the dianisidin sulfate may be used for the production of solutions of hydrazo compound to be subsequently subjected to rearrangement.

When the dianisidine sulfate has been washed free from impurities soluble in benzene, the paste is mixed with about 90 to 100 gallons of water, filtered off in a wash filter press and again washed with water (about 150 gallons). The dianisidin sulfate is thus obtained in a purified state such that it can be directly used, or it can be dried and converted into a dried product.

The dianisidin sulfate can be converted into the free base by boiling with water and precipitating the free base with caustic soda from the hot solution. The dianisidin can thus be obtained in a state of high purity.

In a similar manner to that above described, other solvents than benzene, such as toluene, can be used. So also, hydrazo-benzene can be rearranged to benzidine, hydrazo-toluene can be rearranged to tolidin, etc.

From the foregoing description it will be seen that the benzidine compound is obtained directly, in a state of high purity and with high yields, from solutions of hydrazo compounds in organic solvents, the rearrangement being carried out in the presence of the solvent and the benzidine compound being separated directly in a solid state as sulfate, from which the solvent and soluble impurities can be readily separated.

I claim:—

1. The method of producing compounds of the benzidine series from hydrazo compounds, which comprises gradually adding sulfuric acid to a solution of the hydrazo compound in a low boiling inert solvent of the benzene series with vigorous agitation, whereby the benzidine compound separates out as sulfate in the form of a stiff paste.

2. The method of producing dianisidine from hydrazanisol, which comprises subjecting a solution of the hydrazo compound in an inert organic solvent immiscible with water to the action of sulfuric acid of about 30 to 40% strength by gradually adding the acid while maintaining a regulated temperature of about 8 to 15° C. and with vigorous agitation of the mixture, and thereby producing the benzidine compound directly in an insoluble form.

3. The method of producing compounds of the benzidine series from hydrazo compounds, which comprises subjecting a solution of the hydrazo compound in an inert organic solvent immiscible with water to the action of sulfuric acid and thereby effecting the formation and separation of the benzidine compound as a sulfate in the form of a paste, and separating the solvent from the paste.

4. The method of producing compounds of the benzidine series from hydrazo compounds, which comprises subjecting a solution of the hydrazo compound in an inert organic solvent immiscible with water to the action of sulfuric acid and thereby effecting the formation and separation of the benzidine compound as a sulfate in the form of a paste, separating the organic solvent from the paste and washing soluble impurities from the paste by adding further amounts of immiscible solvent and separating the same from the paste.

5. The method of producing compounds of the benzidine series from hydrazo compounds, which comprises subjecting a solution of the hydrazo compound in an inert organic solvent immiscible with water to the action of sulfuric acid and thereby effecting the formation and separation of the benzidine compound as a sulfate in the form of a paste, separating the solvent from the paste and subsequently washing the sulfate of the benzidine series with water.

6. The method of producing dianisidine from hydrazanisol, which comprises subjecting a solution of hydrazanisol in an inert organic solvent immiscible with water to the action of sulfuric acid and thereby effecting the formation and separation of the dianisidine in the form of the sulfate as a paste, and separating the organic solvent from the paste.

7. The method of producing compounds of the benzidine series, which comprises subjecting a mixture of a hydrazo compound with zinc residue to extraction with an inert organic solvent immiscible with water, separating the solution of the hydrazo compound from the zinc residue, and subjecting the resulting solution to the action of sulfuric acid, whereby the benzidine compound is directly produced in the form of the sulfate, and separating the sulfate from the solvent.

8. In the process of producing dianisidine from hydrazanisol which is produced by the reduction of nitranisol with zinc and caustic alkali, the steps which comprise extracting the reduction mass with an organic solvent immiscible with water, subjecting the resulting solution to the action of sulfuric acid, whereby the dianisidine is directly produced in the form of a sulfate, and separating the sulfate from the solvent.

9. The method of producing compounds of the benzidine series from hydrazo compounds, which comprises gradually adding sulfuric acid of from about 30 to 50% strength to a solution of the hydrazo compound in a low boiling inert solvent of the benzene series with vigorous agitation whereby the benzidine compound separates out as sulfate in the form of a stiff paste.

10. In the production of a compound of the benzidine type by the rearrangement of a hydrazo compound in presence of sulfuric acid and of an inert organic solvent immiscible with water, the step comprising the employment of more than one mol of said sulfuric acid for each mol of hydrazo compound initially present.

11. In the production of a compound of the benzidine type by rearrangement of a hydrazo compound in the presence of sulfuric acid, the steps which comprise the use of an inert organic solvent immiscible with water, together with an amount of sulfuric acid of about 30 to 50 per cent strength sufficient to effect the formation and separation of the benzidine compound as a sulfate in the form of a paste.

12. In the production of dianisidine by the rearrangement of hydrazanisol, the steps comprising carrying out the reaction in the presence of sulfuric acid of about 30 to 50 per cent strength and in the presence of benzene as a solvent.

13. In the production of dianisidine by the rearrangement of hydrazanisol in the presence of sulfuric acid, the steps characterized by the employment of benzene and an amount of sulfuric acid of about 30 to 50 per cent strength sufficient to effect the formation and separation of dianisidine as a sulfate in the form of a paste.

14. In the production of a compound of the benzidine type by the rearrangement of a hydrazo compound in the presence of sulfuric acid, the step which comprises carrying out the reaction in the presence of benzene as a solvent.

15. In the production of dianisidine by the rearrangement of hydrazanisol in the presence of sulfuric acid, the step which comprises carrying out the reaction in the presence of an inert aromatic liquid hydrocarbon as a solvent.

16. In the production of dianisidine by the rearrangement of hydrazanisol by means of sulfuric acid, the step which comprises carrying out the reaction in the presence of benzene as a solvent.

17. In the production of dianisidine by the rearrangement of hydrazanisol in solution in an inert organic solvent immiscible with water, the step which comprises carrying out the reaction in the presence of sulphuric acid and a reducing agent, said reducing agent minimizing the oxidation of the reduction and re-arrangement products.

18. In the production of dianisidine by the rearrangement of one part by weight of hydrazanisol, the improvement which comprises carrying out the reaction in the presence of an inert organic solvent immiscible with water and about 1.4 part of sulphuric acid of about 40% strength.

19. In the production of a compound of the benzidine type by the re-arrangement of a hydrazo compound in the presence of sulfuric acid, the improvement which comprises carrying out the reaction in the presence of an inert hydrocarbon as a solvent.

20. In the production of a compound of the benzidine type by the re-arrangement of a hydrazo compound in the presence of sulfuric acid of about 30 to 50 per cent strength, the improvement which comprises carrying out the reaction in the presence of an inert liquid hydrocarbon of the benzene series as a solvent.

21. In the production of a compound of the benzidine type by the re-arrangement of a hydrazo compound in the presence of sulfuric acid and an inert liquid hydrocarbon as a solvent, the improvement which comprises carrying out the reaction in the presence of a reducing agent, said reducing agent minimizing the oxidation of the reduction and re-arrangement products.

In testimony whereof I affix my signature.

RALPH A. NELSON.